United States Patent [19]
Thornton et al.

[11] Patent Number: 5,870,319
[45] Date of Patent: Feb. 9, 1999

[54] DEVICE AND METHOD FOR COLLECTING DATA FROM GRAPHED IMAGES

[75] Inventors: Glen Allen Thornton, Garland; Linda Jean Ferrio; David S. Stone, both of Plano; Veronica L. Howard, Dallas, all of Tex.

[73] Assignee: Texas Instruments Incorporated, Dallas, Tex.

[21] Appl. No.: 582,799

[22] Filed: Jan. 4, 1996

[51] Int. Cl.$^6$ .............................. G06F 3/00; G06F 13/00
[52] U.S. Cl. .............. 364/710.01; 364/706; 364/709.12; 364/710.08
[58] Field of Search .......................... 364/709.16–710.01, 364/710.04, 710.08, 715.01, 718, 731, 735, 706

[56] References Cited

U.S. PATENT DOCUMENTS

| | | | |
|---|---|---|---|
| 4,535,416 | 8/1985 | Kano et al. | 364/710.01 |
| 5,191,525 | 3/1993 | LeBrun et al. | 707/500 |
| 5,289,393 | 2/1994 | Kaya | 364/710.01 |
| 5,535,317 | 7/1996 | Tanaka et al. | 364/710.01 |
| 5,557,718 | 9/1996 | Tsuneyoshi et al. | 345/440 |
| 5,586,060 | 12/1996 | Kuno et al. | 364/554 |

*Primary Examiner*—Emmanuel L. Moise
*Attorney, Agent, or Firm*—Frederick J. Telecky, Jr.; Richard L. Donaldson

[57] ABSTRACT

A computing device (10) for capturing designated data from one or more graphic applications (60) comprising a screen area (16) for viewing one or more graphic functions (111) wherein each function (111) is manipulated with a plurality of shortcut keys (75) or a cursor pad (24) communicably linked to the screen area (16). A first applications (60) with a screen interface (100) for the user is provided within the device (10) having graphing capabilities for manipulating the graphs (111) on the screen area (16). A cursor (64), cursor pad (24) and shortcut keys (75) are used to trace data along the graph (111) and capture the points to a stack area (84) where they are stored for future use by a second application (90, 92). The second application (90, 92) gives the user the ability to further study and analyze the data. Alternatively, shortcut keys (75) can be used to automate the transfer from the first application (60) to the second application (90, 92).

20 Claims, 4 Drawing Sheets

DEVICE AND METHOD FOR COLLECTING DATA FROM GRAPHED IMAGES

TECHNICAL FIELD

The present invention relates in general to a device and method of analyzing math functions and, more specifically, to a portable computing device capable of generating and displaying graphic data functions and capturing user selected data of said functions for further use by independent applications.

BACKGROUND OF THE INVENTION

Without limiting the scope of the invention its background is described in connection with an electronic calculator having math graphing capabilities and memory means for storing data and functions. It should be understood, however, that principles disclosed may also be used in other applications such as desktop computers, portable notebook computers and other similar computing devices.

Educational institutions, businesses and individuals depend on electronic computing devices such as computers, calculators and organizers to store, analyze and manipulate information. One such device, the electronic calculator, has proven to be a very useful tool in a number of applications. For example, calculators are commonly used in business applications to prepare financial statements including balance sheets and income statements, and in reconciling balances. Also, calculators are used for engineering applications such as solving equations for stress and strain, resistance and voltage, or chemical concentrations. Further, calculators are commonly used for personal applications such as balancing checkbooks and home budgeting.

In addition, calculators are commonly used in educational applications. Not only are calculators useful for solving mathematical problems, but also, calculators have recently become effective teaching devices. Several developments in calculator technology have enhanced the teaching capabilities of calculators. For example, the incorporation of a screen into the calculator which allows the user to view not only, the answer, but also the formula or equation inputted by the user.

Additionally, calculator screens have enabled the calculator to present graphical data, which is particularly beneficial in teaching applications. This capability allows a user to enter a function or data from an experiment and view the function or the data in a graphical format. The user may then, for example, change a parameter within the formula or the data to see its effect on the graph.

These calculators often have the capability of graphing in a variety of modes. For example, an equation can be graphed as a function of two rectangular variables in the form $y=f(x)$, two polar variables in the form $r=f(\theta)$, or three parametric variables in the form $x=f(t)$ and $y=g(t)$. Some of these calculators also have the capability of determining the vector or (x,y) coordinates of a data point along a graph. With such calculators, a user can position a cursor at a given point or points on a graph or functions and resolve the vector coordinates of the point or points.

These calculators, however, limit the user's ability to study, analyze and edit such data in other applications. For example, should a user wish to collect a series of points and import them into a matrix, list or other similar application, he or she must resort to resolving the individual points one at a time and then inputting into a separate application manually. Calculators with built in scientific, engineering and statistical applications lack a quick method of transferring data between different applications resident to the calculator for further study and analysis by the user.

Thus, what is needed is a way to capture data from a graph or screen image and transfer the data to one or more internal applications for further analysis.

SUMMARY OF THE INVENTION

It has been found that the simple capture of data from a graphing application in an electronic computing device such as a calculator to a second application within the same device is a problem.

Accordingly it is a principle object of the present invention to provide a device and method of capturing data from a graphed math function, curve or geometric shape and storing such data in a stack or internal memory area for transfer to a second application. In this regard, shortcut keys and a cursor pad on device keyboard are used to allow users to trace a graphed image on the calculator screen and select data with the aid of shortcut keys on the calculator keyboard. The data is maintained on a stack/buffer and transferred to other applications within the calculator where they can be further used and analyzed. The applications are resident to the calculating device and provide a plurality of functions, tools and data edit features.

Another object of the present invention is to provide a way of resolving data from either a graphing application or geometric application and transfer the data to either a row-column editor application or history list where vector elements corresponding to reference coordinates of the data are collected and displayed as a group. In the row-column editor application, data are placed on individual rows within the editor each time the user presses a shortcut key on the device keyboard. Each column within the editor consistently represents a given vector element depending on the graph mode or function selected by the user.

Yet another object of the present invention is to provide a quick and simple way of obtaining a history of data in the form of a list which the user can analyze and study. Data are selected by the user from the graphed image and resolved into their corresponding vector coordinates. The coordinates are placed within brackets in the list in the order in which they are captured from the graphic application.

Disclosed is a computing device for capturing designated data from one or more graphic applications comprising a screen area for viewing graphic functions wherein the functions are manipulated with a plurality of shortcut keys 75 communicably linked to the screen area. A first application with a screen interface for the user is provided and application functions provide the user graphing capabilities for manipulating graphs and data functions on the screen area.

The user employs a cursor, cursor pad and shortcut keys 75 to trace data along the graphs and data functions and capture the data to a stack area where they are stored for future use by a second device resident application. The second application gives the user the ability to further study and analyze the data. Alternatively, shortcut keys can be used to automate the transfer from the first application to the second application.

These and other features of the present invention will be apparent to those skilled in the art from the following detailed description of the invention, taken together with the accompanying drawings.

BRIEF DESCRIPTION OF THE DRAWINGS

In the drawings.

Corresponding numerals and symbols in different figures refer to corresponding parts unless otherwise indicated.

DETAILED DESCRIPTION OF THE PREFERRED EMBODIMENT

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
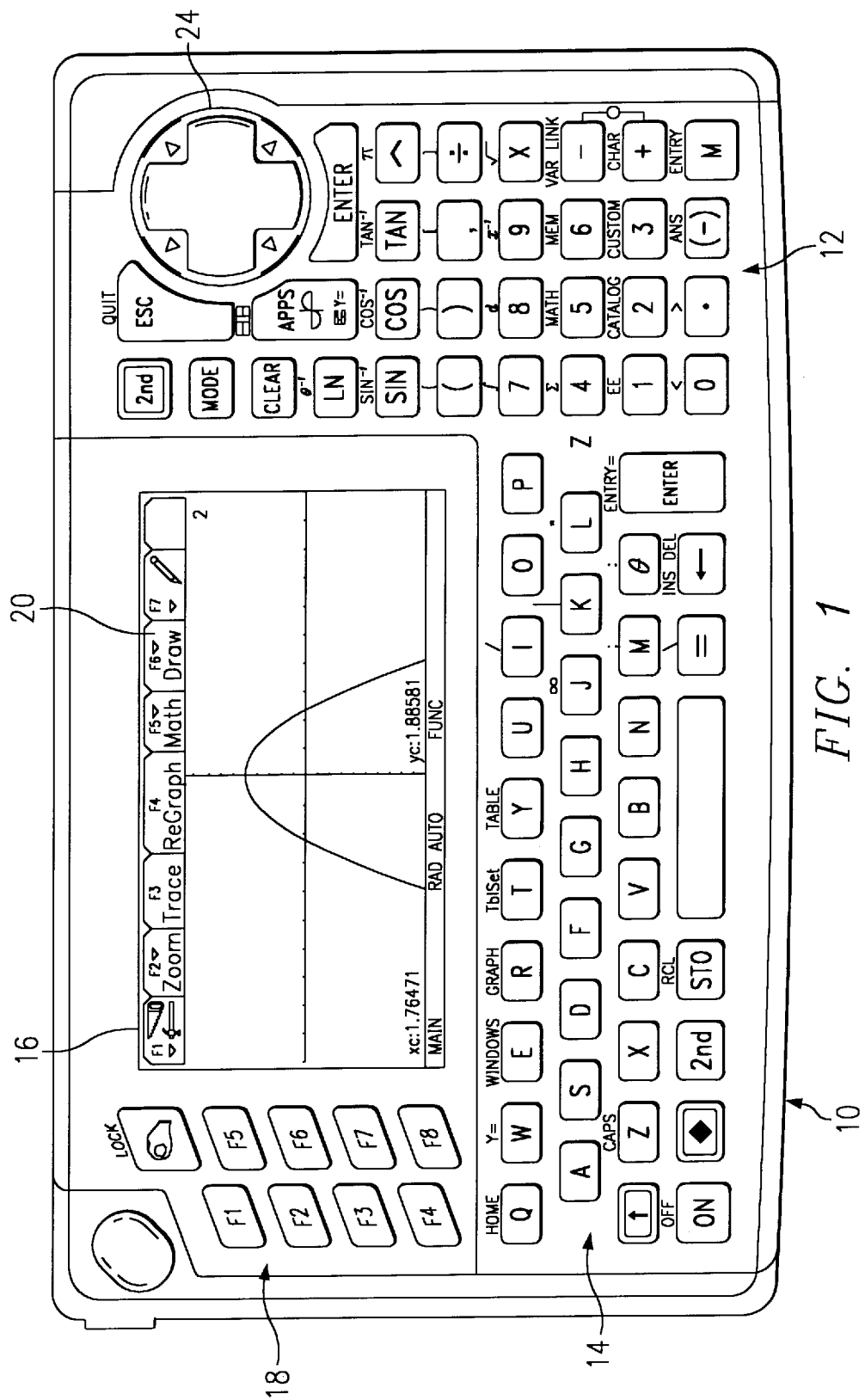
FIG. 1 is a plan view of a computing device having graphing capabilities in accordance with the preferred embodiment of the invention.

In FIG. 1, a computing device having graphing capabilities is generally designated 10. Computing device 10 has a calculator key pad generally designated 12 which includes a plurality of numbered keys and operator keys which perform a variety of math and scientific operations such as adding, subtracting, multiplying, dividing, and evaluating, sine, cosine, tangent and natural logarithm functions. Other functions are also contemplated.

Computing device 10 has a QWERTY keyboard generally designated 14 having a plurality of alpha-numeric keys such as those found on a typewriter or a keyboard of a personal computer. Computing device 10 has screen area 16 capable of displaying graphical images. In the preferred embodiment, screen area 16 is a Liquid Crystal Display (LCD), although, other screen types are equally well-suited to the present invention so long as graphical images can be displayed thereon. In one embodiment of the present invention, screen area 16 has a resolution of 240×128 pixels, but other resolutions densities may also be employed.

Computing device 10 has a plurality of shortcut keys 75 that are generally designated 18. Shortcut keys 75 give the user of computing device 10 access to toolbar menus 20 displayed across the top of the screen area 16. Computing device 10 also has cursor pad 24. Cursor pad 24 allows the user of computing device 10 to move a cursor or cross hair (not pictured) in a plurality of directions about screen area 16. In one embodiment, the cursor can move in eight (8) distinct directions.

Even though FIG. 1 depicts computing device 10 as having calculator keypad 12, QWERTY keyboard 14, screen area 16, shortcut keys 75, and cursor pad 24, it should be understood by one skilled in the art that a variety of computing devices having a variety of similar features are equally well-suited for the present invention so long as such computing devices have graphing capabilities. Such computing devices include, but are not limited to, calculators, notebook computers, and other hand held computing systems.

Figure 2:
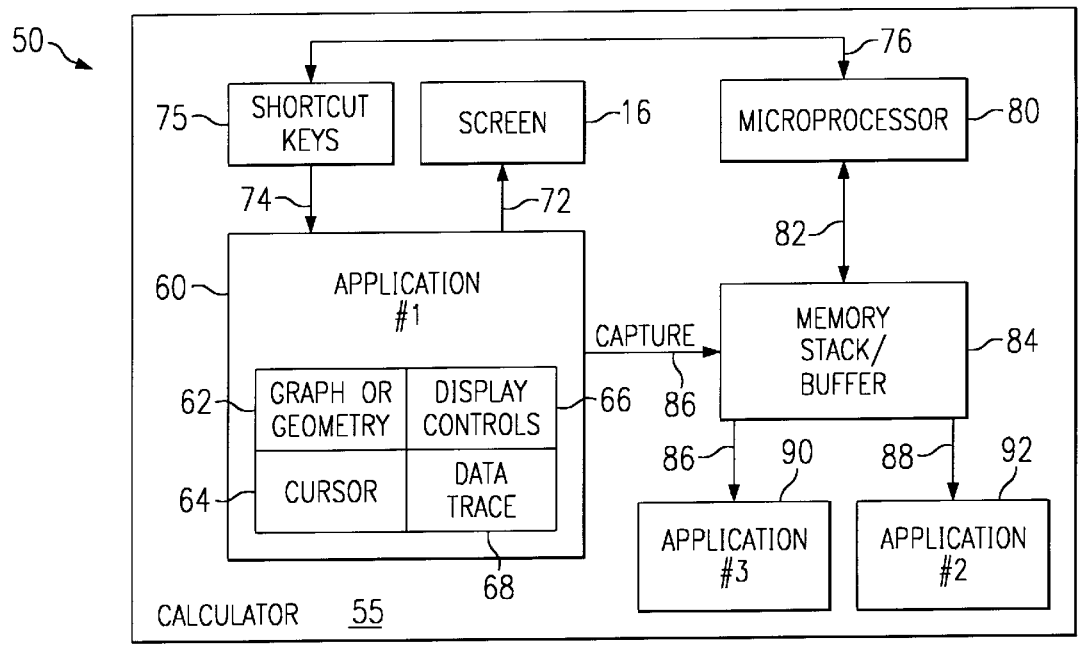
FIG. 2 is a block diagram of a device for capturing data from a graphing application to a second application in accordance with one embodiment of the invention.

Turning now to FIG. 2, a block diagram of a device, denoted generally as 50, for capturing data in one application and transferring it to a second application is shown. All device components and applications are contained within device block 55 which in one embodiment is a portable hand held calculator. A first application 60 is resident to device block 55. First application 60 provides the user with graphing capabilities. In one embodiment, first application 60 employs a means of entering a function, such as y=cos (x) for example, and seeing the resulting graphical representation of the function on screen area 16. In other embodiments, first application 60 permits the user to recall, draw or manipulate standard geometric shapes such as lines, circles, triangles and polygons in general. Other graphing features of first application 60 are within the scope of the invention.

The display controls 66 contains all the logics needed to generate an image on screen area 16. As shown, first application 60 is coupled to screen area 16 via path 72 which may comprise an address/data path for the transfer of information from first application 60 to screen area 16.

Shortcut keys 75 are coupled to the first application 60 via path 74 and specifically to display controls 66 which contains the logics and means of allowing the user to control and manipulate objects on screen area 16. A cursor 64 is provided so users can point at objects on screen area 16 via functions keys 18 and display controls 66. The cursor 64 of first application 60 can be used in conjunction with data trace feature 68 to trace segments of data function, curves, graphs and other graphic images on screen area 16. In this way, a given data can be selected with cursor 64. Shortcut keys 75 can be used to target data on screen area 16 and transfer it automatically to other applications resident to device 10.

Also shown is processor 80 which operates all device block 55 functions and executes internal system programs. In one embodiment, processor 80 is a 68000 based microprocessor but other industry standard microprocessors may be used. Processor 80 is coupled to shortcut keys 75 via path 76 and to memory stack area 84 via path 82.

First application 60 is communicably linked to memory stack area 84 via path 86 allowing data to be transferred and stored in memory stack area 84. In one embodiment, memory stack area 84 comprises Random Access Memory (RAM) of device 10 capable of storing electronic data. In one embodiment, memory stack area 84 is static so that data and information in memory stack area 84 is maintained even after system power is turned OFF.

In operation, data captured in first application 60 is transferred to memory stack area 84 for storage. A user selects a second application 90 or second application 92 via shortcut keys 75 or shortcut keys 75 where the data should be placed for further analysis. As shown, second applications 90 and 92 are resident within device block 55 and provide various data edit and analysis functions not found in first application 60. For example, in one embodiment second application 90 provides a data history listing of the data selected by the user with cursor 64 from graphs, curves and geometric figures displayed by first application 60. Likewise, second application 92 may comprise a multi dimensional row-column editor application for storing vector elements describing user selected data about a user selected reference system. The vector elements correspond to data on the screen area 16 when using first application 60. Other application types and functions may be employed.

Second application 90 and second application 92 have access to the data stored in memory stack area 84 via path 86 and path 88, respectively. After obtaining the data in memory stack area 84, second application 90 and second application 92 can format, modify, analyze and display the data according to specific application functions.

Figure 3:
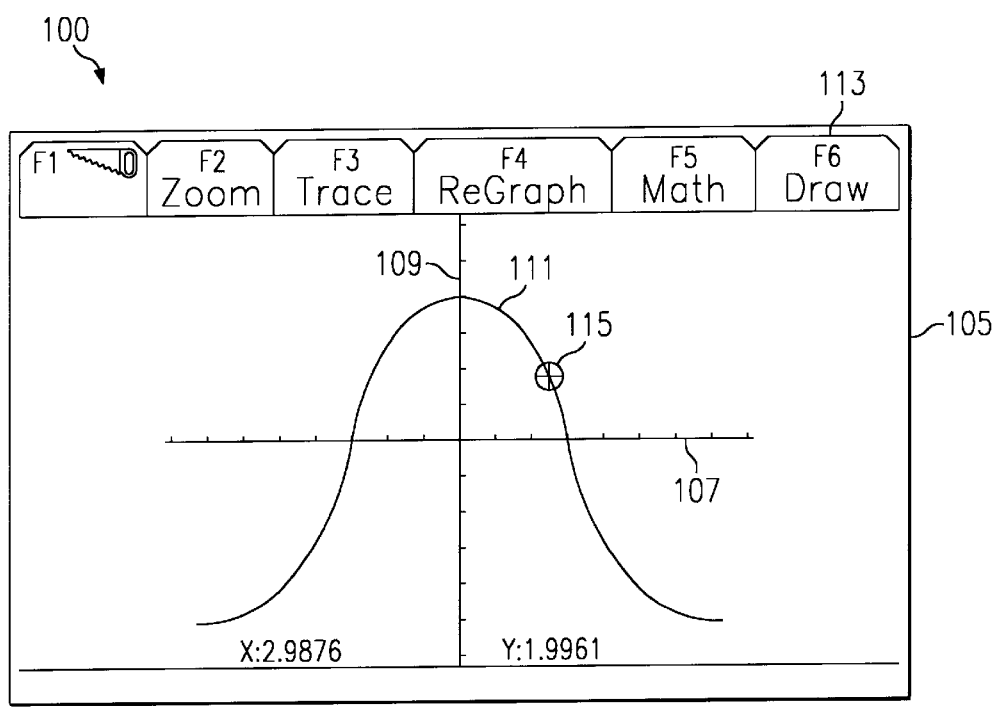
FIG. 3 illustrates the interface to a graphing application in accordance with one embodiment of the invention.

Turning now to FIG. 3, the screen interface to a graphing application is shown and denoted generally as 100. Interface 100 is representative of a user front end for a first application 60 having graphing capabilities. It should be understood that other interface types and graphing applications can be used.

As shown, a border 105 is shown surrounding the interface 100 as it would appear on screen area 16. Within border 105, a pair of coordinate axis 107, 109 are provided as reference for graph 111. Graph 111 is created and displayed on screen area 16 using shortcut key 75 as well as other utilities provided by the graphing functions such as those in toolbar menus 20.

Toolbar menus 113 shows the functions, operations, utilities and commands available to the user from screen interface 100. The user may use to create, display and modify graph function 111 using toolbar menus 113. In one embodiment, the user can select from utilities, zoom, trace, regraph, math and draw functions from toolbar menus 113. Other function types may also be provided.

A cursor 115 permits users to trace graph 111 and select data on the function defining graph 111. In the preferred embodiment, the user moves cursor 115 with cursor pad 24 and selects a data of graph 111 with one of the shortcut keys 75. Shortcut keys 75 automatically determine the destination of the data. Thus, shortcut keys 75 can be used to automatically transfer chosen data to a second application 90 or 92.

Figure 4:
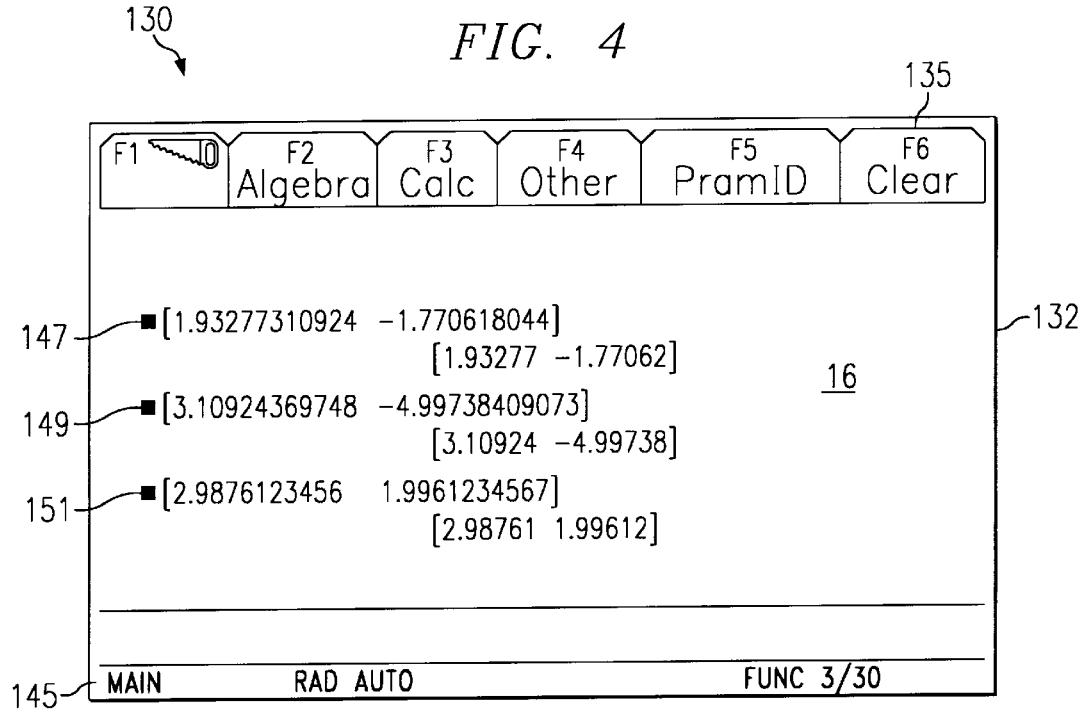
FIG. 4 illustrates the interface to a history application in accordance with one embodiment of the invention.
Figure 5:
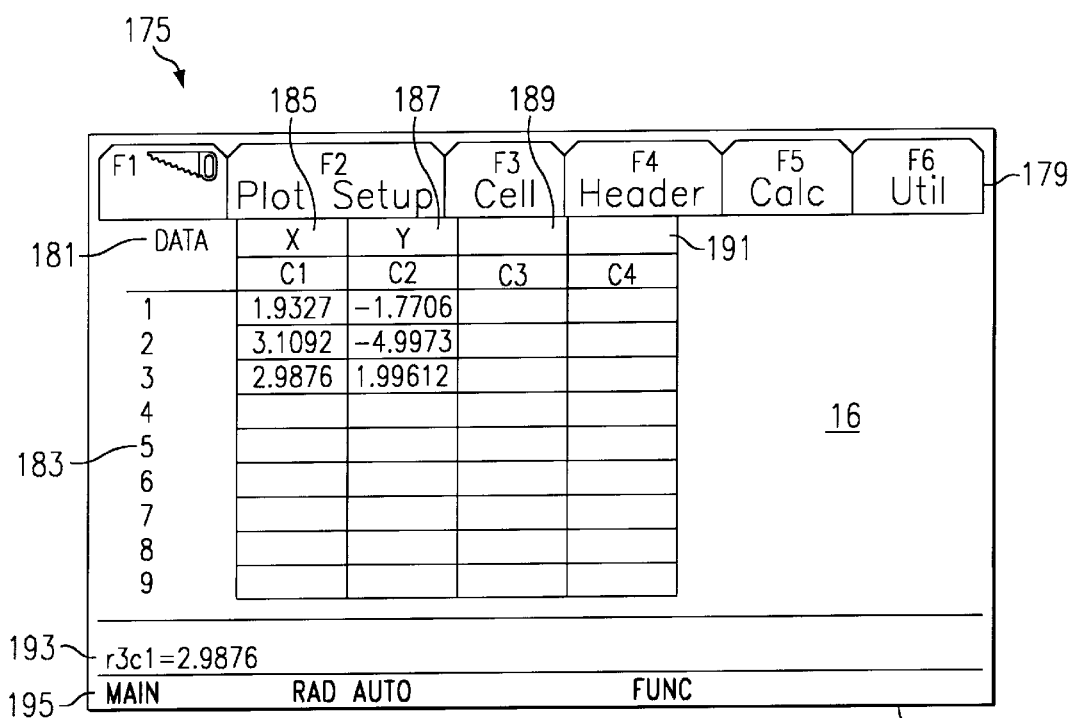
FIG. 5 illustrates the interface to a row-column editor application in accordance with one embodiment of the invention.

FIG. 4 and FIG. 5 depict two different screen interfaces to internal applications of computing device 10. In FIG. 4, the screen interface to a data history application is shown and denoted generally as 130. Screen interface 130 was preselected by the user either through shortcut keys 75 or from toolbar menus 20.

Border 132 surrounds the images seen on screen area 16. At top is shown toolbar menus 135 containing various utilities, commands, and user functions. In one embodiment, the user selects from various functions including utilities, algebra, calculate, Program IO and clear from toolbar menus 135. Other function types may also be used.

Data 147, 149 and 151 are listed in history order in screen area 16 according to how they were selected by the user with cursor 115. For example, data 151 is shown near the bottom of screen area 16 indicating it was the latest data to be captured. The information in screen area 16 of interface 130 indicates the vector coordinates of the corresponding data when captured. The location of cursor 64 when the data is captured determines the value of the coordinates.

A status area 145 is provided giving the user status information for the current data history session. While a single embodiment of screen interface 130 is shown, it should be understood that other applications may be used and are within the scope of the invention.

In FIG. 5, the screen interface to a row-column editor application is shown and designated generally as 175. Screen interface 175 is a type of internal application within device 10 and may be selected by the user as a second application 90 or 92 in which captured data from a first application 60 are placed. As with the history application of FIG. 4 of screen interface 130, screen interface 175 was preselected by the user either through shortcut keys 75 or toolbar menus 20.

Border 177 surrounds the contents of screen area 16 when the row-column editor application screen interface 175 is shown. Within screen area 16 a toolbar menus 179 is provided giving the user access to a plurality of data manipulation tools and other functions. As shown, the user can select cell sizing, plot setup, cell, header, calculation and utility options from toolbar menus 179. Other functions may be used.

The particular embodiment shown and described is illustrative of a possible screen interface 175 for a row-column editor application. Screen area 16 has consecutively numbered rows 183 listed along the left side of screen area 16. Columns 185, 187, 189 and 191 are also shown extending across screen area 16. More or less rows and columns may be employed.

As shown, a particular square of the row-column editor application screen 175 contains a single vector coordinate of data captured from a graphic image of the first application 60. Thus, as an example a user may select data from a graph 111 and transfer it to screen interface 175 of a row-column editor application. This operation may be accomplished through the use of shortcut keys 75 or from toolbar menus 20 option. While two dimensional vector elements are shown, it should be understood that other vector dimensions may be resolved and displayed in rows 183 and columns 185, 187, 189 and 191 or more according to user selected applications. These applications include function, parametric, polar, 3-D and sequence graphing and geometry, among others. Other applications may be employed.

A current position indicator 193 highlights the value of the current row-column editor application selection. A status area 195 is provided giving the user status information for various settings. While a single embodiment of screen interface 175 is shown, it should be understood that other applications may be used and are within the scope of the invention.

Figure 6:
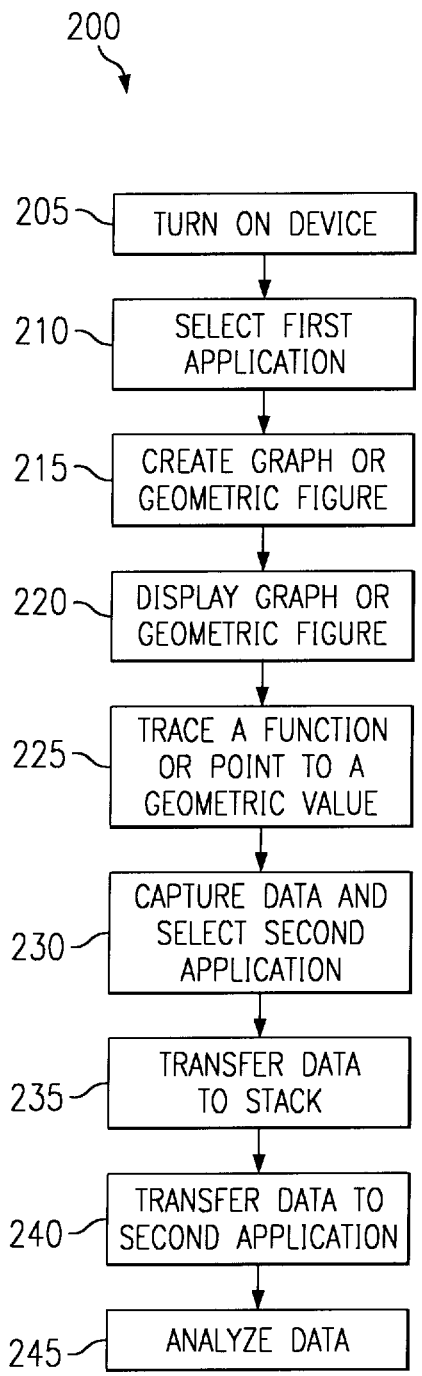
FIG. 6 is a flow chart of the process used with the present invention to capture data in a graphing application and transfer them to a second application.

FIG. 6 depicts a flow chart of the process, denoted generally as 200, used with the present invention to capture data in a graphing application 60 and transfer them to a second application 90 or 92. The process starts with step 205 where the user turns the device 10 ON. Next, the user selects a first application 210 having graphing or geometric capabilities.

Using available tools and features, the user next creates a graph or geometric FIG. 215 which is displayed 220 on the screen area 16. The graph or figure may be manipulated with shortcut key 75, cursor pad 24 or other device 10 input options. When the user is ready to collect data, he or she uses functions keys 18 and cursor pad 24 to move cursor 64 along the function or to a geometric value 225 and choose data of the function or FIG. 225 for storage in stack/buffer 84.

The user captures data and selects a second application 230 with the shortcut keys 75 or some similar method and transfers 235 the data to a stack/buffer 84 area for storage and then completes the transfer 240 to applications such as the history list or row-column editor application as herein described. Once the transfer is complete, the second application 90 or 92 can be used to further analyze the data 245 completing the process 200.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A portable electronic apparatus comprising:

a screen area for displaying a graphical image of a function and a coordinate system;

a first application for generating the graphical image of the function and the coordinate system to be displayed on the screen area;

a cursor displayable on the screen area, the cursor selectively positionable along the graphical image of the function;

a function key for capturing data relating to the position of the cursor along the graphical image of the function relative to the coordinate system and for storing the data in a memory; and a second application communicably linked to the memory, the second application retrieving the data and displaying the data in a nongraphical format on the screen area.

2. The apparatus as recited in claim 1 wherein the second application is a history list for collecting, arranging and viewing the data relating to the position of the cursor along the graphical image of the function relative to the coordinate system.

3. The apparatus as recited in claim 1 wherein the second application is a row-column editor application for collecting, arranging and viewing the data relating to the position of the cursor along the graphical image of the function relative to the coordinate system.

4. The apparatus as recited in claim 1 wherein the second application has data edit functions for analyzing and manipulating the data.

5. The apparatus as recited in claim 1 wherein the coordinate system of the first application further comprises a coordinates system selected from the group consisting of a two-dimensional rectangular, a parametric, a polar, and a three-dimensional rectangular coordinate system.

6. The apparatus as recited in claim 1 further comprising a shortcut key for automatically capturing the data relating to the position of the cursor along the graphical image of the function relative to the coordinate system and transferring the data to the second application.

7. The apparatus as recited in claim 1 wherein the apparatus is a portable calculator.

8. The apparatus as recited in claim 1 further including a microprocessor for controlling the transfer of the data from the first application to the memory and from the memory to the second application.

9. A portable electronic apparatus comprising:

a screen area for displaying a graphical image of a function and a coordinate system;

a first application for generating the graphical image of the function and the coordinate system to be displayed on the screen area;

a cursor displayable on the screen area, the cursor traceably positionable along the graphical image of the function;

a function key for capturing data relating to the position of the cursor along the graphical image of the function relative to the coordinate system and for storing the data in a memory; and a second application communicably linked to the memory, the second application retrieving the data and displaying the data in a nongraphical format on the screen area.

10. The apparatus as recited in claim 9 wherein the second application is a history list for collecting, arranging and viewing the data relating to the position of the cursor along the graphical image of the function relative to the coordinate system.

11. The apparatus as recited in claim 10 wherein the second application has data edit functions for analyzing and manipulating the data.

12. The apparatus as recited in claim 10 wherein the coordinate system of the first application further comprises a coordinates system selected from the group consisting of a two-dimensional rectangular, a parametric, a polar, and a three-dimensional rectangular coordinate system.

13. The apparatus as recited in claim 10 further comprising a shortcut key for automatically capturing the data relating to the position of the cursor along the graphical image of the function relative to the coordinate system and transferring the data to the second application.

14. The apparatus as recited in claim 10 wherein the apparatus is a portable calculator.

15. The apparatus as recited in claim 10 further including a microprocessor for controlling the transfer of the data from the first application to the memory and from the memory to the second application.

16. The apparatus as recited in claim 9 wherein the second application is a row-column editor application for collecting, arranging and viewing the data relating to the position of the cursor along the graphical image of the function relative to the coordinate system.

17. A method of capturing and using data relating to the position of a cursor along a graphical image of a function relative to a coordinate system displayed on a screen area of a portable electronic apparatus, the method comprising the steps of:

generating the graphical image of the function and the coordinate system using a first application;

displaying the graphical image of the function and the coordinate system on the screen area;

selecting data from the graphical image of the function relative to the coordinate system by positioning a cursor along the graphical image of the function;

capturing data relating to the position of the cursor along the graphical image of the function relative to the coordinate system;

storing the data in a memory; and retrieving the data and displaying the data in a nongraphical format on the screen area using a second application.

18. The method as recited in claim 17 wherein the step of selecting data from the graphical image of the function relative to the coordinate system by positioning a cursor along the graphical image of the function further comprises the step of traceably positioning the cursor along the graphical image of the function.

19. The method as recited in claim 17 further comprising the step of analyzing the data in a row-column editor application.

20. The method as recited in claim 17 further comprising the step of analyzing the data in a history list application.

* * * * *